United States Patent [19]
Kiczek et al.

[11] Patent Number: 5,343,714
[45] Date of Patent: Sep. 6, 1994

[54] SPIRAL FREEZER

[75] Inventors: Edward F. Kiczek, Long Valley, N.J.; David J. Klee, Emmaus; Kevin S. McAfee, Alburtis; Roger A. Howells, Orefield, all of Pa.

[73] Assignee: Air Products and Chemicals, Inc., Allentown, Pa.

[21] Appl. No.: 886,544

[22] Filed: May 20, 1992

[51] Int. Cl.$^5$ .............................. F25D 25/02
[52] U.S. Cl. ........................ 62/381; 62/380; 62/63; 62/64
[58] Field of Search ............... 62/63, 64, 381, 401, 62/380

[56] References Cited

U.S. PATENT DOCUMENTS

| | | | |
|---|---|---|---|
| 3,391,548 | 7/1968 | Gram | 62/381 |
| 3,733,848 | 5/1973 | Duron et al. | 62/381 |
| 3,866,432 | 2/1975 | Harrison | 62/381 X |
| 3,868,827 | 3/1975 | Linhardt et al. | 62/401 X |
| 4,023,381 | 5/1977 | Onodera | 62/381 |
| 4,103,507 | 8/1978 | Benois | 62/381 X |
| 4,315,409 | 2/1982 | Prentice et al. | 62/401 X |
| 4,324,110 | 4/1982 | Lovette, Jr. et al. | 62/381 |
| 4,356,707 | 11/1982 | Tyree, Jr. et al. | 62/381 |
| 4,370,861 | 2/1983 | Lovette, Jr. et al. | 62/63 |
| 4,612,780 | 9/1986 | Bailey et al. | 62/381 |
| 4,739,623 | 4/1988 | Tyree, Jr. et al. | 62/63 |
| 4,866,946 | 9/1989 | Klee | 62/63 |
| 4,947,654 | 8/1990 | Sink et al. | 62/381 |
| 4,953,365 | 9/1990 | Lang et al. | 62/381 |
| 5,020,330 | 6/1991 | Rhoades et al. | 62/381 X |

*Primary Examiner*—Henry Bennett
*Assistant Examiner*—Christopher B. Kilner
*Attorney, Agent, or Firm*—James C. Simmons; William F. Marsh

[57] ABSTRACT

A spiral type freezer constructed and operated to introduce refrigerated atmosphere into the bottom of the insulated chamber and circulate the atmosphere in a circulation flow from the bottom of the chamber to an exit on top of the chamber, the refrigerated atmosphere producing a thermal gradient from the bottom to the top of the chamber so that the freezer is operated non-isothermally.

7 Claims, 3 Drawing Sheets

1

SPIRAL FREEZER

FIELD OF THE INVENTION

The present invention pertains to freezing devices capable of operating at extremely low temperatures (e.g. cryogenic temperatures) of the type that employ a spiral conveyor belt disposed principally inside an insulated chamber so that articles to be frozen are moved from an entry end at a lower level of the chamber to a discharge end at a higher level of the chamber by means of the spiral conveyor while being exposed to a refrigerated atmosphere.

BACKGROUND OF THE INVENTION

Spiral type cryogenic freezers that are currently in commercial use are as near as possible to being an isothermal chamber. The freezers such as shown in U.S. Pat. Nos. 4,866,946, 4,739,623 and 4,612,780 have a spiral type conveyor inside of an insulated box shaped chamber with temperatures maintained at or near the desired refrigeration temperature. For example, such freezers can use liquid nitrogen, liquid carbon dioxide or mechanically refrigerated air to achieve the freezing process.

One of the problems with the spiral type freezer is the fact that the box like insulated chamber results in heat transfer coefficients that are lower than those normally found with in-line tunnel freezers and therefore the spiral type freezer is by and large an inefficient device. In-line tunnel freezers can be lengthy for high production rates although the length does not effect the process efficiency.

Prior art spiral freezer have focused on trying to efficiently use the refrigeration inside of the insulated container by employing circulating fans, baffles and pressurized chambers at the inlet or outlet of the freezing chamber in order to avoid the problems of low efficiency.

One of the problems with prior art spiral type freezers is that the chamber or insulated box that contains the spiral conveyor is of necessity larger than the spiral disposed inside so that workers can enter the chamber during periods of non-use to clean the interior of the chamber and the conveyor. This is especially necessary if the freezer is used for food products.

Attempts have been made to miniaturize or reduce the size of the freezer, one such freezer being offered for sale by Fuji Tetsumo of Japan. However this freezer has the entire refrigeration apparatus disposed inside the container and thus increases the problem with trying to maintain cleanliness of the freezer.

SUMMARY OF THE INVENTION

In order to overcome the problem with prior art spiral type freezers a freezer has been designed which combines the use of an inner solid cage inside the spiral rounding the housing to the maximum extent possible and using circulating fans together to effect a non-isothermal operation in order to have an effective and efficient food freezer. According to the present invention, air cooled to $-250°$ F. ($-157°$ C.) can be introduced into the bottom of the housing or insulated enclosure forced to circulate in a horizontal direction around and through the conveyor gradually exchanging refrigeration with the products being frozen and exiting the top of the insulated chamber at approximately $-100°$ F.

DETAILED DESCRIPTION OF THE PREFERRED EMBODIMENT

Figure 1:
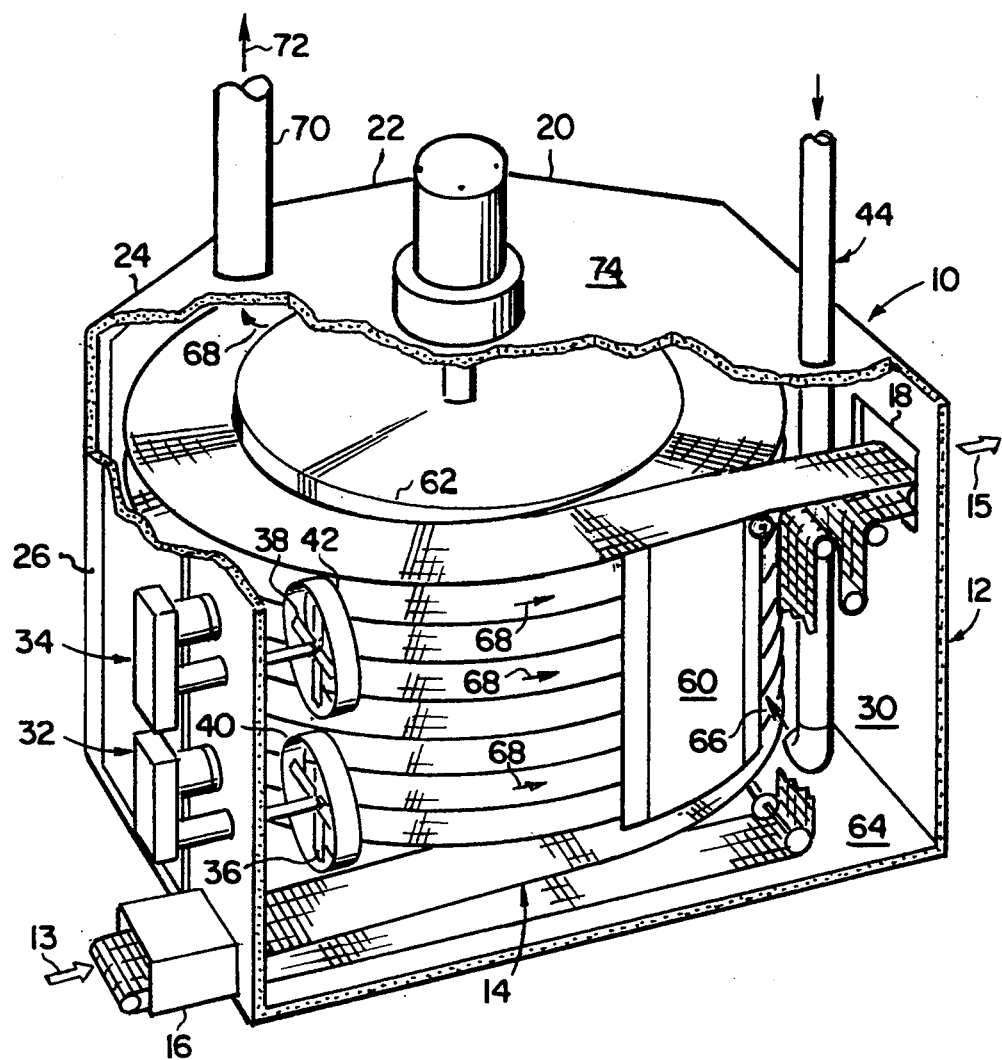
FIG. 1 is a perspective view with portions broken away for clarity, illustrating a spiral freezer according to the present invention.

Referring to FIG. 1, numeral 10, shows a spiral cryogenic freezer according to the present invention. Freezer 10 includes an outer housing enclosure or cabinet 12 in the form of a double walled insulated chamber. Disposed within the cabinet 12 is a spiral conveyor system adapted for moving a product from an entry portal 16 to and through a discharge portal 18 in cabinet 12. The product is moved along the conveyor in an ascending spiral path as is well known in the art.

Cabinet 12 is constructed so that the conveyor system 14 fits with minimum clearance inside thereof. In order to effect this, three angularly shaped walls 20, 22 and 24 are utilized where there is no need to make room for mechanical equipment. The other three walls 26, 28 and 30 form three perpendicular faces of the cabinet. The walls 26, 28 and 30 are shaped so that circulating fan assemblies 32, 34 can be mounted on the cabinet 12 with the fan blades and fan shrouds disposed inside of the housing in one corner as shown. In the other corner, the take-up mechanism for the conveyor 14 and an inlet 44 for refrigerated atmosphere as will hereinafter be explained are included.

Figure 2:
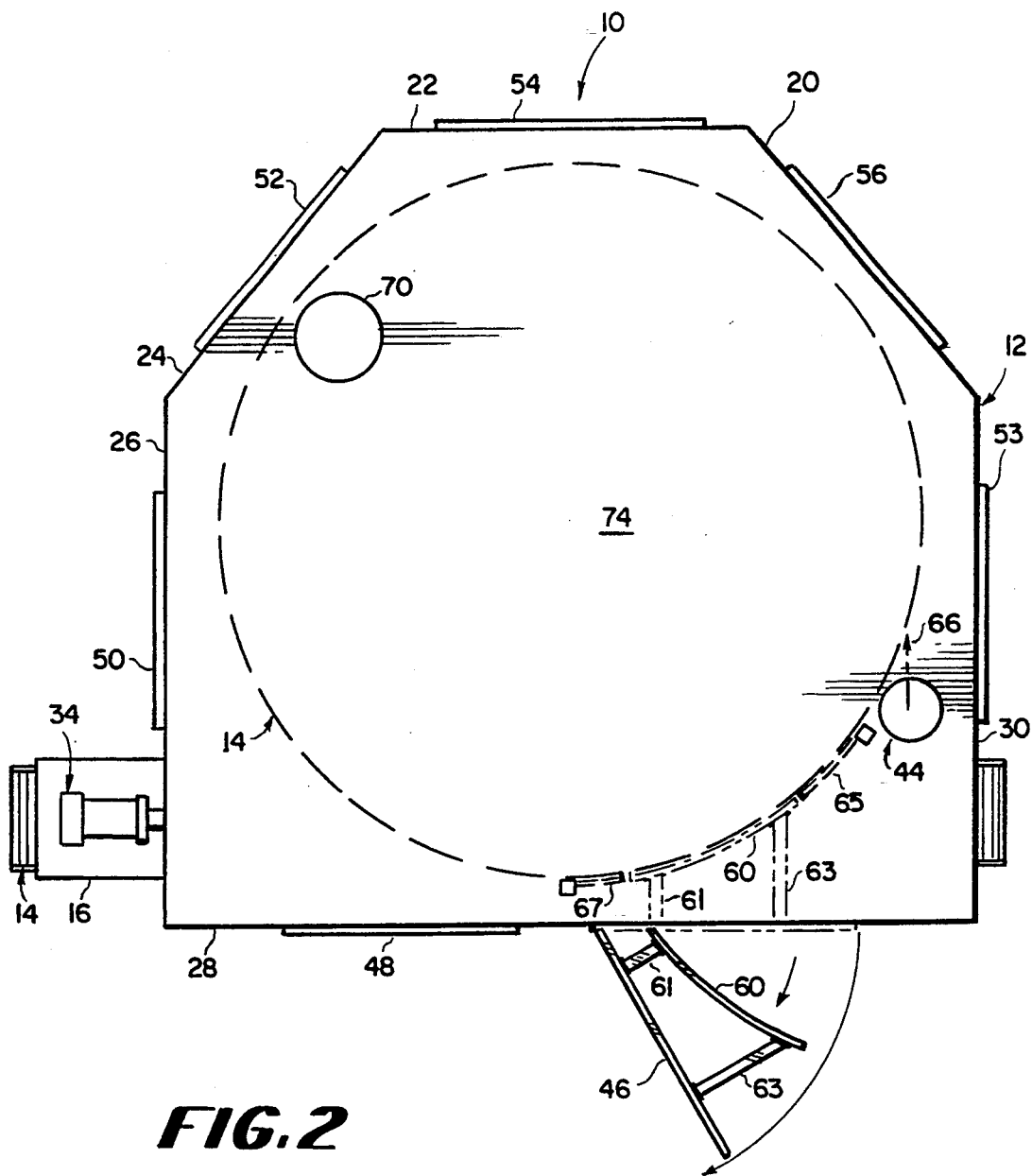
FIG. 2 is a top plan view of the freezer of FIG. 1.

The cabinet 12 includes a plurality of large doors 46, 48, 50, 52, 54, 56, 58 in the walls of the cabinet as shown in FIG. 2 so that the entire cabinet 12 can be made accessible for cleaning. The doors can be opened and the entire inside of the freezer 10 made accessible to workers. Of particular note is door 46 which includes a circular baffle 60 fixed to door 46 by braces or struts 61, 63. Baffle 60 cooperates with fixed baffles 65, 67 as shown by the ghost lever for use in directing the circulating gas flow (refrigerated atmosphere) as will hereinafter be explained.

The conveyor 14, while being of a conventional type, includes a solid inner cage 62 disposed in the interior portion of the spiral in order to effect a flow of refrigerated atmosphere as will hereinafter be explained. The spiral is driven by a drive which is equivalent to a capstan drive by techniques that are well known in the spiral freezer art.

As set forth above, a refrigerated atmosphere inlet 44 which can be in the form of a large diameter conduit conducts refrigerated atmosphere down to the bottom 64 of chamber 12 and directs it in the direction shown by arrow 66. Fans 36, 38 force the refrigerated atmosphere to circulate in the direction as shown by arrows 68 with warmed refrigerated atmosphere exiting the chamber 12 via a conduit 70 as shown by arrow 72.

Figure 3:
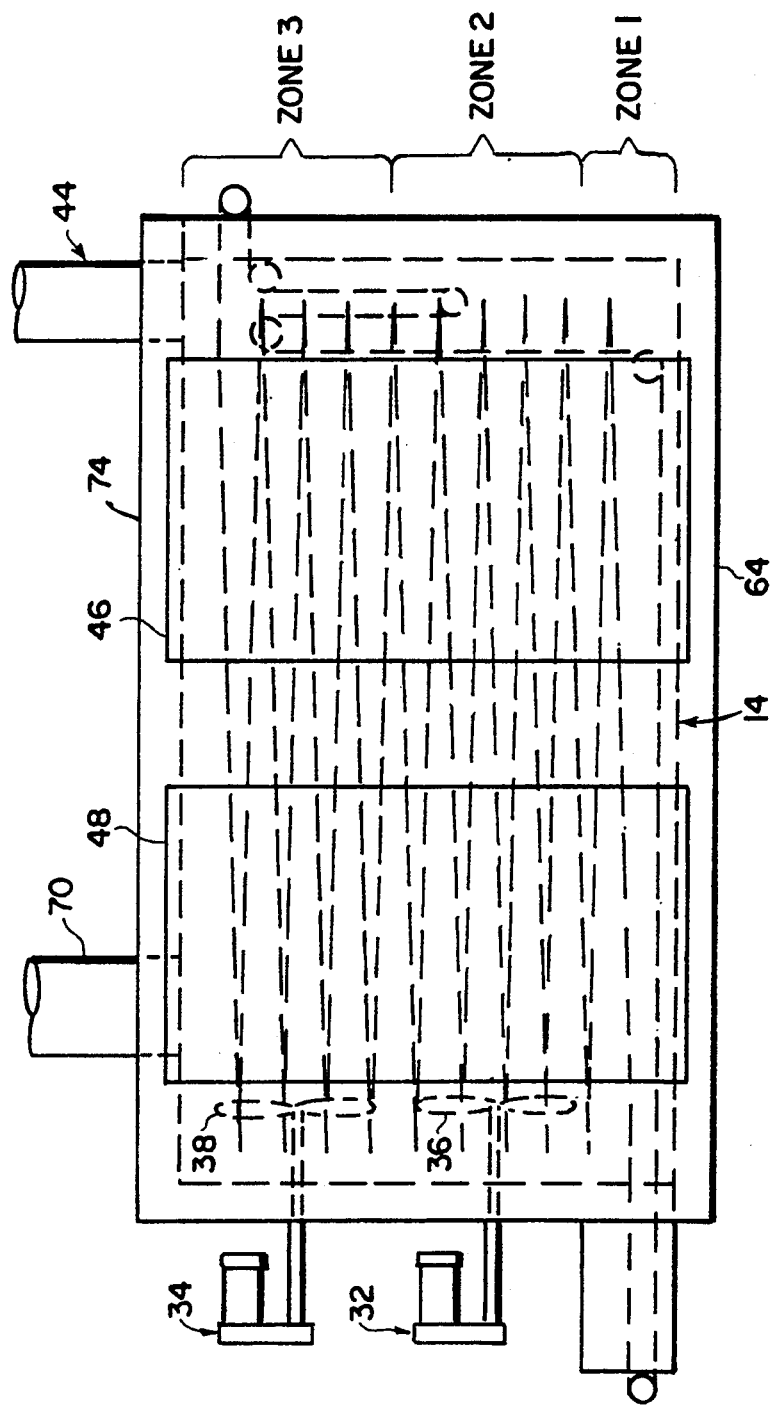
FIG. 3 is a plan schematic of the freezer of FIG. 1 showing the temperature profile inside of the freezer when in use.

Referring to FIG. 3, the chamber 12 is shown with the circulating fans 36, 38, the inlet conduit 44 and the outlet conduit 70. More importantly, the schematic of FIG. 3 shows that the admission of refrigerated air or refrigerated atmosphere to the bottom of the chamber 12 results in three distinct zones of refrigeration overlying each other from the bottom to the top of the chamber 12. The bottom most zone shown by the bracket as zone 1 in the case of air introduced at a temperature of −250° F. (−157° C.) through conduit 44 results in a temperature gradient of between −250° F. and −218° F. (−139° C.). Zone 2 which overlies zone 1 has a temperature gradient varying from −170° F. (−112° C.) to −146° F. (−99° C.) and zone 3 overlying zone 2 has a temperature gradient between −118° F. (−83° C.) to −100° F. (−73° C). Thus it can be seen that the freezer 10 of the present invention operates non-isothermally. The combination of the spiral conveyor 14 and the shape of the chamber 12 as well as the use of air refrigerated to −250° F. introduced in the manner shown results in high force convection heat transfer thus producing greater refrigeration capacity (e.g. 3 to 4 times) than conventional spiral freezers.

Moreover the freezer of the present invention permits maximum space/maximum efficiency for freezers of this type. The freezer can use other sources of refrigeration. For example, liquid nitrogen or carbon dioxide could be introduced into the chamber to produce the required refrigerated atmosphere.

The freezer of the present invention has an insulated enclosure that is designed with the minimum space around the conveyor path. This can be accomplished as shown. Ideally the conveyor could be disposed inside of a cylinder so long as there would be room for the circulating fans and the conveyor take up mechanism. The freezer shown in the drawing has the two square corners to accommodate the recirculating fans and the take up loop for the conveyor as well as the conduit for introducing the refrigerator atmosphere. The use of the solid inner cage 62 and the closely spaced walls of the insulated chamber 12 and the fans 36, 38 provide the smallest possible area for recirculating refrigerated atmosphere within the enclosure 12. The small annular space between the cage and the interior walls of the enclosure 12 require a small volume of recirculating gas to achieve the gas velocity necessary for effective forced convection heat transfer. In one embodiment of the invention, gas velocity is 900 feet per minute (4.57 liters per second) to produce a heat-transfer coefficient of 8.3 BTU/hr-ft$^2$-°F. (47.1 W/m$^2$K). Since the volume of recirculating gas has been minimized, the fan horsepower can be lower and less refrigeration is wasted.

A further benefit of a design of the type according to the present invention is lower heat loss through the insulation.

Having thus described our invention what is desired to be secured by Letters Patent of the United States is set forth in the appended claims.

We claim:

1. In a freezer of the type having a spiral conveyor disposed within an insulated chamber, said spiral adapted to move items to be refrigerated and from a lower inlet in said chamber to an elevated outlet in said chamber said spiral conveyor having an axis of rotation, the improvement comprising:

means for introducing a source of refrigerated atmosphere into a lower portion of said chamber; and
   means to circulate said refrigerated atmosphere inside said chamber from the point of introduction to a point of egress at an upper location in said chamber, said means to circulate refrigerated atmosphere is effected by including at least two circulating fans disposed generally perpendicular to the axis of rotation of said conveyor and directed to circulate refrigeration around said chamber, an inner solid cage disposed inside said spiral conveyor, said chamber having a cross-sectional shape perpendicular to the axis of rotation of a five sided irregular polygon with only two of the included angles being right angles, said chamber being disposed around said conveyor to effect circulation of refrigeration around said conveyor generally parallel to the direction of movement of said conveyor whereby, when in use, said insulated chamber is operated under non-isothermal conditions.

2. A freezer according to claim 1 wherein said source of refrigerated atmosphere is a gas cooled to −250° F.

3. A freezer according to claim 1 wherein said source of refrigerated atmosphere is liquid or solid cryogen sprayed into said chamber.

4. A method of operation a spiral cryogenic freezer containing a spiral conveyor to freeze articles wherein the refrigeration capacity is increased from 3 to 4 times comprising the steps of:

modifying said spiral freezer by incorporating a solid cage inside said spiral conveyor and providing a chamber having a cross-sectional shape in a plane disposed perpendicular to an axis of rotation of said spiral conveyor of a five sided irregular polygon with only two of the included angles being right angles, said chamber disposed around said conveyor to effect circulation of refrigeration inside said freezer around said conveyor generally parallel to the direction of movement of said conveyor;
   introducing refrigerated air at approximately −250° F. into the bottom of said freezer below said conveyor;
   circulating said refrigerated air around said spiral conveyor to permit exchange of refrigeration between said air and articles or conveyor in said freezer; and
   exhausting air from said freezer at about −100° F.

5. A method according to claim 4 wherein said refrigerated air is circulated so that at least three zones of refrigeration are established across said freezer, said zones disposed serially from the bottom to the top of said freezer.

6. A method according to claim 5 wherein a first zone of refrigeration at the bottom of the freezer is at a temperature of between −250° F. and −200° F., a second zone of refrigeration on top of said bottom zone is at a temperature of between −170° F. and −140° F. and a third zone of refrigeration on top of said second zone is at a temperature of between −120° F. and −100° F.

7. A method according to claim 6 wherein said freezer is operated with the spiral conveyor moving articles to be frozen from a lower entrance in said freezer to an upper exit in said freezer.

* * * * *